United States Patent
Rousset et al.

(10) Patent No.: US 12,108,778 B2
(45) Date of Patent: Oct. 8, 2024

(54) NATURAL CREAMER WITH HIGH TOLERANCE TO ACIDITY AND MINERALS IN BEVERAGE

(71) Applicant: SOCIETE DES PRODUITS NESTLE S.A., Vevey (CH)

(72) Inventors: Philippe Rousset, Dublin, OH (US); Maxime Saffon, Hilliard, OH (US); Peter Steffes, Hilliard, OH (US); Xiaoping Fu, Dublin, OH (US)

(73) Assignee: Societe des Produits Nestle S.A., Vevey (CH)

( * ) Notice: Subject to any disclaimer, the term of this patent is extended or adjusted under 35 U.S.C. 154(b) by 0 days.

(21) Appl. No.: 16/652,493

(22) PCT Filed: Sep. 28, 2018

(86) PCT No.: PCT/EP2018/076518
§ 371 (c)(1),
(2) Date: Mar. 31, 2020

(87) PCT Pub. No.: WO2019/068590
PCT Pub. Date: Apr. 11, 2019

(65) Prior Publication Data
US 2020/0236981 A1 Jul. 30, 2020

Related U.S. Application Data

(60) Provisional application No. 62/566,768, filed on Oct. 2, 2017.

(51) Int. Cl.
*A23L 9/20* (2016.01)
*A23C 11/10* (2021.01)
(Continued)

(52) U.S. Cl.
CPC .............. *A23L 9/24* (2016.08); *A23C 11/103* (2013.01); *A23L 2/06* (2013.01); *A23L 2/56* (2013.01);
(Continued)

(58) Field of Classification Search
CPC ............. A23L 9/24; A23L 2/06; A23C 11/103
See application file for complete search history.

(56) References Cited

U.S. PATENT DOCUMENTS 5,780,092 A * 7/1998 Agbo ..................... A23C 11/00
426/569
6,426,110 B1 7/2002 Basa
(Continued)

FOREIGN PATENT DOCUMENTS

| EP | 1900292 | 3/2008 |
| KR | 101483245 | 1/2015 |

(Continued)

OTHER PUBLICATIONS

Braverman, Jody (Acid found in Lemons and Limes, Livestrong, Aug. 22, 2015, Retrieved from Internet URL: https://web.archive.org/web/20151221101930/http://www.livestrong.com:80/article/255275-acid-found-in-lemons-limes/). (Year: 2015).*

(Continued)

*Primary Examiner* — Stephanie A Cox
(74) *Attorney, Agent, or Firm* — K&L Gates LLP (57) ABSTRACT

Natural Creamers for providing whitening and indulgent texture/mouthfeel of beverage and food products are provided. The creamers have long-term stability, high whitening capacity and a pleasant mouthfeel when added to beverage and food, while being free from artificial additives the creamers comprising plant oil and plant proteins, and being further characterized in that the creamers comprise baking soda and citrus fruit juice concentrate, wherein the citrus (Continued)

fruit juice concentrate comprises acid component comprising citric acid and malic acid.

8 Claims, 6 Drawing Sheets

(51) Int. Cl.
    *A23L 2/06*     (2006.01)
    *A23L 2/56*     (2006.01)
    *A23L 2/60*     (2006.01)
    *A23L 2/66*     (2006.01)
    *A23L 2/68*     (2006.01)

(52) U.S. Cl.
    CPC   *A23L 2/60* (2013.01); *A23L 2/66* (2013.01); *A23L 2/68* (2013.01)

(56) References Cited

U.S. PATENT DOCUMENTS

| | | | |
|---|---|---|---|
| 7,018,668 B2 | 3/2006 | Mllagran et al. | |
| 2014/0044854 A1* | 2/2014 | Bezelgues | A23C 13/14 |
| | | | 426/586 |
| 2014/0205731 A1* | 7/2014 | Kloek | A23C 11/00 |
| | | | 426/580 |
| 2017/0020154 A1 | 1/2017 | Fu et al. | |
| 2017/0251703 A1* | 9/2017 | Wolf | A23L 2/52 |
| 2018/0007935 A1* | 1/2018 | Reh | A23F 5/465 |

FOREIGN PATENT DOCUMENTS

| | | | |
|---|---|---|---|
| RU | 2477972 C2 | 3/2013 | |
| WO | 2010040727 | 4/2010 | |
| WO | 2010091871 | 8/2010 | |
| WO | 2016102313 | 6/2016 | |
| WO | WO-2016102313 A1 * | 6/2016 | A23F 5/465 |
| WO | WO-2017001392 A1 * | 1/2017 | A23L 29/256 |
| WO | 2017162715 | 9/2017 | |
| WO | 20917162715 | 9/2017 | |
| WO | WO-2017162715 A1 * | 9/2017 | A23L 29/272 |

OTHER PUBLICATIONS

Karadeniz, "Main Organic Acid Distribution of Authentic Citrus Juices in Turkey", Turkish Journal of Agriculture and Forestry, vol. 28, Issue No. 4, 2004, pp. 267-271.

* cited by examiner

NATURAL CREAMER WITH HIGH TOLERANCE TO ACIDITY AND MINERALS IN BEVERAGE

CROSS REFERENCE TO RELATED APPLICATIONS

The present application is a National Stage of International Application No. PCT/EP2018/076518, filed on Sep. 28, 2018, which claims priority to U.S. Provisional Patent Application No. 62/566,768, filed on Oct. 2, 2017, the entire contents of which are being incorporated herein by reference.

BACKGROUND

The present disclosure generally relates to food products. More specifically, the present disclosure relates to creamers for food products such as coffee and tea.

Creamers can be in liquid or powder forms and are widely used as whitening agents, also as the texture/mouthfeel modifier with hot and cold beverages, e.g., coffee, cocoa, tea, etc. They are commonly used in place of milk and/or dairy cream. Creamers may come in a variety of different flavors and provide a whitening effect, mouthfeel, body, and a smoother texture.

More and more consumers are concerned by the synthetic or artificial additives in food products. Thus, there is a demand for commercially available natural creamers. Usually creamers contain stabilizers such as carrageenan, cellulose gums, cellulose gels, emulsifiers, or buffers or whitening agents that are all not perceived as natural by the consumers. These perceived artificial and unhealthy food ingredients, however, are typically needed to guarantee the physical stability of the creamer over the shelf life of the product and after pouring into coffee. In addition they are needed to achieve the desired whitening and texture/mouthfeel effect in the coffee. In the absence of these ingredients, the coffee creamers are much less stable over time and show less whitening and adverse sensorial effects. In addition, without the presence of synthetic or artificial additives, severe physical destabilization of the creamers and loss of functionality can occur in the finished beverages.

Currently, "pseudo natural creamers" do exist, which are dairy, non-dairy or plant based and contain one or more of the following: hydrocolloids as stabilizers/thickeners, emulsifiers, buffer salts, such as dipotassium phosphate, and sometime artificial flavors. Although touted as being natural, these pseudo natural creamers are not completely natural.

Most dairy, non-dairy and plant based creamers experience physical separation in low pH and high mineral content beverages. The physical separation is often referred to as flocculation, curdling, clumping, aggregation or sedimentation. This phenomenon is related first to the discharge of emulsion droplets then the aggregation of the droplets. The emulsion should be stable and free of aggregates or clumps during its shelf life. It should also provide good sensorial properties without any physical instability when added to beverages.

SUMMARY

In one aspect the present invention relates to a creamer free of artificial additives, the creamer comprising plant oil, and proteins, further characterized in that the creamer comprises baking soda and citrus fruit juice concentrate, wherein the citrus fruit juice concentrate comprises citric acid and malic acid.

The present disclosure relates to creamers for food products and methods of making the creamers. The creamers can be stored at refrigerated temperatures and be stable for extended periods of time (up to 9 months). The creamers have high whitening capacity and a pleasant mouthfeel while masking the bitterness and astringency of a beverage.

An advantage of the present disclosure is to provide a natural creamer having a high whitening capacity, good sensory properties and physical stability during storage without using artificial ingredients.

Another advantage of the present disclosure is to provide a natural creamer that does not include any artificial or synthetic ingredients.

This invention is to solve the curdling or separation issues for beverages. For instance when creamer is added to a brewed coffee, a curdling or separation may be obtained due to the interactions of emulsion with minerals such as, calcium, magnesium from brew water and/or acids from coffee. The current invention is to solve this curdling with all natural ingredients without modifying the creamer physical appearance and quality.

In an aspect, the present invention relates to a process for manufacturing a creamer of the invention, comprising the steps of:
(i) preparing a premix solution comprising baking soda and water;
(ii) addition of citrus juice concentrate to the premix solution at a high agitation to release carbon dioxide and result in a natural chelating solution;
(iii) low shear mixing of the natural chelating solution in presence of plant protein, plant oil and sugar to achieve a completed hydration of dry ingredients and optionally add flavor.

In an embodiment, the present invention relates to a process for manufacturing a liquid creamer of the invention, comprising the steps of:
(i) Obtaining ingredients including oils kept under low agitation or alternative process conditions to avoid foam generation;
(ii) Preparing a premix solution comprising baking soda and water.
(iii) Addition of citrus juice concentrate to the premix solution at a high agitation to release carbon dioxide and result in a natural chelating solution.
(iv) Low shear mixing of the natural chelating solution in presence of plant protein, plant oil and sugar to achieve a completed hydration of dry ingredients and optionally add flavor;
(v) Homogenization at conditions configured to obtain an emulsion particle size ranging from 0.01 to 2 μm (micrometers) with a d50<1 μm and d90<2 μm;
(vi) UHT treatment; and
(vii) Filling the container aseptically at 0.5-20° C.

In an embodiment of the process of the invention the emulsion particle size may peak at around 0.7 μm, for example between 0.6 and 0.8 μm.

In an embodiment of the process of the invention the proteins are plant proteins, for example in the form of a plant protein powder.

The particle size d50 and d90 are used in the conventional sense for particle size distributions by volume. The d50 is the size in microns that splits the volume distribution with half above and half below this diameter. The d90 is the size in microns of the measured particle size distribution wherein 90% of the particles by volume lie below this diameter. The particle size distribution may be measured by laser light scattering, microscopy or microscopy combined with image analysis. For example, the particle size distribution may be measured by laser light scattering.

In an embodiment of the process of the invention the UHT treatment is performed at between 135 and 145° C. for between 3 and 15 seconds. The UHT treatment may be at a minimum 141° C. for about 3 seconds. The UHT treatment may be 139° C. for 12 seconds.

The premix solution according to the process of the invention may be prepared at a temperature range from about 0.5 to 85° C. For example the premix solution may be prepared at between 65 and 85° C.

Yet another advantage of the present disclosure is to provide a long-term, stable creamer (for example a liquid creamer) having excellent whitening effect that is stable for at least 9 months at a temperature of about 0.5° C.-20° C. In an embodiment the aseptic filling is done at 0.5-7.2° C.

Yet another advantage of the present disclosure is to provide a long-term, stable creamer (for example a liquid creamer) having excellent homogeneity. That is without any phase separation, clogs, clumps or gelling.

Another advantage of the present disclosure is to provide a liquid creamer that has a good mouthfeel, body, smooth texture, and a good flavor without off-notes.

An embodiment of the invention provides a process for manufacturing a powdered creamer of the invention, comprising the steps of:
 (i) preparing a premix solution comprising baking soda and water;
 (ii) addition of citrus juice concentrate to the premix solution at a high agitation to release carbon dioxide and result in a natural chelating solution;
 (iii) low shear mixing of the natural chelating solution in presence of plant protein, plant oil and sugar to achieve a completed hydration of dry ingredients and optionally add flavor;
 (iv) homogenization at conditions configured to obtain an emulsion particle size ranging from 0.01 to 2 μm (micrometers) with a d50<1 μm and d90<2 μm; and
 (v) spray drying the emulsion to obtain a powdered creamer.

Additional features and advantages are described herein, and will be apparent from, the following Detailed Description and the figures.

DETAILED DESCRIPTION

In one embodiment, the present invention relates to a creamer free of artificial additives, the creamer comprising plant oil, and proteins (for example plant proteins), further characterized in that the creamer comprises baking soda and citrus fruit juice concentrate, wherein the citrus fruit juice concentrate comprises citric acid and malic acid. The ratio of baking soda to acid component comprising citric acid and malic acid may be between 1 to 3 on a dry weight basis, for example between 1.3 to 2.5, for further example between 1.5 to 1.8.

The creamer of the invention may be a liquid creamer or a powdered creamer.

The term "citrus fruit juice concentrate" comprises lemon juice, grape fruit, orange, berries, lime and combinations thereof. The term also includes clarified form. In an embodiment the "citrus fruit juice concentrate" is concentrated juice from citrus fruits selected from the group consisting of lemon, grape fruit, orange, lime and combinations of these.

In one embodiment, the present invention relates to use of combination of citric acid and malic acid and baking soda as chelating agent in a creamer. The chelating agent is formed in-situ by mixing natural baking soda with natural citrus juice such a way that when these components are added to creamer, the creamer does not curdle or flocculate in coffee (for instance 100% Arabica) brewed with water hardness up to 500 ppm.

In an embodiment the baking soda is naturally extracted sodium bicarbonate for example the material known as natural baking soda.

In an embodiment, the ratio of proteins:fat is more than 1:20, for example between 1:20 and 1:7, for further example between 1:15 and 1:3.

In an embodiment the Lumisizer instability index is less than 40. For a powdered creamer it is understood that the creamer is reconstituted with water for this measurement.

In one embodiment the creamer pH is greater than 6.

In an embodiment, the creamer of the present invention comprises added sugar. In a further embodiment, the creamer of the present invention is free from added sugar.

In one embodiment, the creamer of the present invention comprises an added sugar:protein mass ratio ranging from about 75:1 to about 10:1, for example from about 75:1 to about 25:1. In one embodiment, the creamer of the present invention is free of additives comprising emulsifiers, buffers, additional whitening agents, anti-foaming agents, surfactants or any other artificial ingredients.

The creamer may be free from low molecular mass emulsifiers. In the context of the present invention the term low molecular mass emulsifiers refers to emulsifiers with a molecular mass below 1500 Dalton. Low molecular mass emulsifiers include, but are not limited to, monoacylglycerols, diacylglycerols, diacetylated tartaric acid esters of monoglycerides, acetylated monoglycerides, sorbitan trioleate, glycerol dioleate, sorbitan tristearate, propyleneglycol monostearate, glycerol monooleate and monostearate, sorbitan monooleate, propylene glycol monolaurate, sorbitan monostearate, sodium stearoyl lactylate, calcium stearoyl lactylate, glycerol sorbitan monopalmitate, succinic acid esters of monoglycerides and diglycerides, lactic acid esters of monoglycerides and diglycerides, lysophospholipids, phospholipids, galactolipids, and sucrose esters of fatty acids.

In one embodiment a creamer according to the invention is free from added monoacylglycerols, diacylglycerols, diacetylated tartaric acid esters of monoglycerides, acetylated monoglycerides, sorbitan trioleate, glycerol dioleate, sorbitan tristearate, propyleneglycol monostearate, glycerol monooleate and monostearate, sorbitan monooleate, propylene glycol monolaurate, sorbitan monostearate, sodium stearoyl lactylate, calcium stearoyl lactylate, glycerol sorbitan monopalmitate, succinic acid esters of monoglycerides and diglycerides, lactic acid esters of monoglycerides and diglycerides, lysophospholipids, phospholipids, galactolipids, and sucrose esters of fatty acids. For example it may be free from added monoacylglycerols, diacylglycerols, diacetylated tartaric acid esters of monoglycerides, acetylated monoglycerides, sorbitan trioleate, glycerol dioleate, sorbitan tristearate, propyleneglycol monostearate, glycerol monooleate and monostearate, sorbitan monooleate, propylene glycol monolaurate, sorbitan monostearate, sodium stearoyl lactylate, calcium stearoyl lactylate, glycerol sorbitan monopalmitate, succinic acid esters of monoglycerides and diglycerides, lactic acid esters of monoglycerides and diglycerides, lysophospholipids, and sucrose esters of fatty acids.

The creamer of the invention may be free from buffers added as such, for example it may be free from buffer salts and acids added as such. The creamer of the invention may be free from phosphates such as monophosphates and diphosphates.

The creamer of the invention may be free from solid particulate whitening agents, for example the creamer may be free from titanium dioxide.

The creamer of the invention may be free from anti-foaming agents added as such.

The creamer of the invention may be free from surfactants, for example synthetic surfactants, for further example synthetic surfactants added as such.

The creamer of the invention may be free from dairy milk fat and dairy milk proteins. For example, the creamer of the invention may be dairy-free.

In an embodiment, the proteins are plant proteins selected from the group consisting of pea protein, potato protein, pumpkin protein, lentil protein, almond protein, rice protein, peanut protein, quinoa protein, coconut protein, oat protein and combinations of these. The proteins may be plant proteins comprised within or consisting of an ingredient selected from the group consisting of liquid pea extract, pea juice, pea protein isolates, pea powder, potato protein isolates, pumpkin seed protein isolates, almond proteins, lentil protein isolates, rice proteins isolates, peanut protein isolates, quinoa protein isolates and combinations thereof.

The creamer of the present invention may include combinations of milk (skim or whole, raw or pasteurized, almond, cashew, flax, coconut or any plant based milk), heavy cream, sugar (as well as natural sweeteners), protein (dairy proteins/caseinates, pea protein (liquid pea extract, pea juice, pea protein isolates, pea powder or combinations thereof), rice protein, oat protein, potato protein, almond proteins, lentil protein isolates, peanut protein isolate, quinoa protein isolates, coconut proteins or a combination thereof), oil from plants (coconut oil, coconut cream, flax oil, almond oil, cashew cream, cashew paste, and other nut oil and paste or combination of all), and natural flavors. The creamer may comprise pea protein for example yellow pea protein. The fat, protein and sugar in the creamer can all come from natural sources. The creamer possesses a stability without developing unfavorable phenomena such as aggregation, separation, gelling, clogging, clumping, or feathering. Moreover after addition to a hot beverage such as coffee or tea, no physical separation, such as aggregation, separation or curdling will occur.

In an embodiment the creamer comprises almond paste and coconut oil.

In an embodiment the creamer comprises coconut cream and coconut oil.

In an embodiment the creamer comprises almond paste, coconut cream and coconut oil.

In an embodiment the creamer comprises oat flour and coconut oil.

In an embodiment the creamer comprises a gum selected from the group consisting of gellan gum (for example high acyl gellan gum), guar gum and combinations of these.

In an embodiment the added sugar is from a sugar source selected from the group consisting of beets, canes, condensed milk, honey, molasses, agave syrup, maple syrup, malt, corn, tapioca, potato and combinations thereof. For example the added sugar may be in the form of an ingredient selected from the group consisting of beet sugar, cane sugar, condensed milk, honey, molasses, agave syrup, maple syrup, malt and combinations thereof.

In an embodiment the plant oil is a fat source selected from the group consisting of coconut oil, coconut cream, almond oil, almond butter, almond paste, cashew oil, cashew butter, cashew paste and combinations thereof. In the context of the present invention, the term fat refers to triglycerides. Fats are the chief component of animal adipose tissue and many plant seeds. Fats which are generally encountered in their liquid form are commonly referred to as oils. In the present invention the terms oils and fats are interchangeable.

In an embodiment the creamer further comprises flavors.

In an embodiment the creamer comprises natural sweeteners selected from the group consisting of Lou Han Gou (monk fruit) extract, stevia, rebaudiosides, and combinations thereof.

The creamers in embodiments of the present disclosure contain lemon juice, apple juice, grape fruit juice or any juice that is rich in citric acid and malic acid. The citrus fruit juice concentrate according to the invention may comprise between 30 and 50 wt. % acids. An example of a suitable citrus fruit juice concentrate is the lemon juice concentrate, supplied by Citromax S.A.C.L (Tucumán, Argentina)), containing 40~50% total solid in which comprise 34~43% citric acid and 4~5% malic acid as a percentage of the total concentrate.

The creamers in embodiments of the present disclosure contain Natural baking soda, natural soda ash, Nahcolite, Natron, Natrite, Trona, Lye or other natural alkaline agent.

The proteins are functionalized as natural emulsifiers to form oil emulsion droplets without any low molecular mass emulsifiers, such as e.g., lecithin, monoglycerides, succinic acid esters of monoglycerides, diacetyl tartaric acid esters of monoglycerides, etc. The particle size for the oil emulsion stabilized with the above natural emulsifiers, e.g. dairy and plant protein, can ranged from 0.1 micron meter to 2.0 micron meter with the most concentration at 0.7 micron meter. In any embodiments of the creamer of the present disclosure, the amount of protein present in the creamer can range between about 0.1% and about 1% by mass. More specifically, the protein can be about 0.1%, 0.2%, 0.3%, 0.4%, 0.5%, 0.6%, 0.7%, 0.8%, 0.9%, 1%, by mass and the like. It should be appreciated that any two amounts of the protein recited herein can further represent end points in a preferred range of the protein. For example, the amounts of 0.2% and 0.4% by mass can represent the individual amounts of the protein in the creamer as well as a preferred range of the protein in the creamer ranging between about 0.2% and about 0.4% by mass The plant based creamers in embodiments of the present disclosure contain some larger particles with size ranged from 10 microns to 40 microns. These particles are the signature particles from the plant base ingredient, such as coconut, almonds and other nuts that are rich in insoluble fibers.

Figure 1:
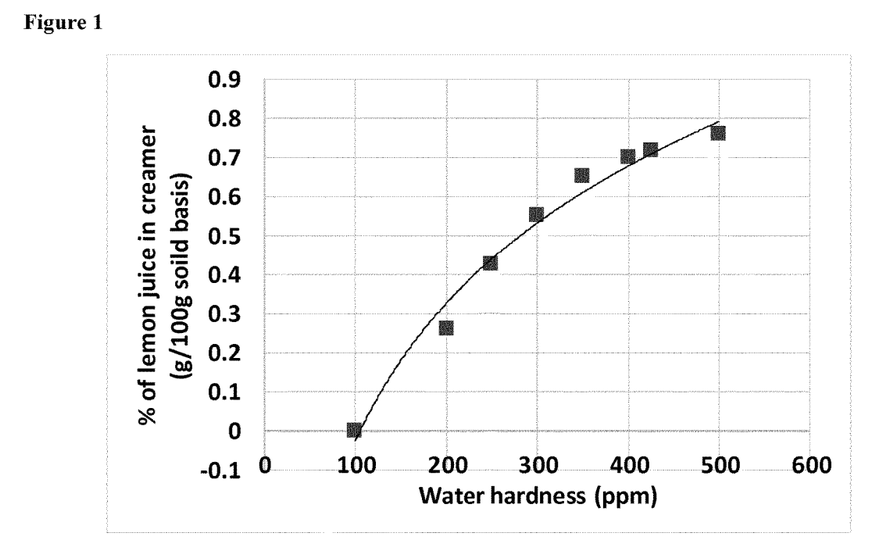
FIG. 1 shows the amount of lemon juice (on a dry basis) required as a function of water hardness in the final beverage.
Figure 2:
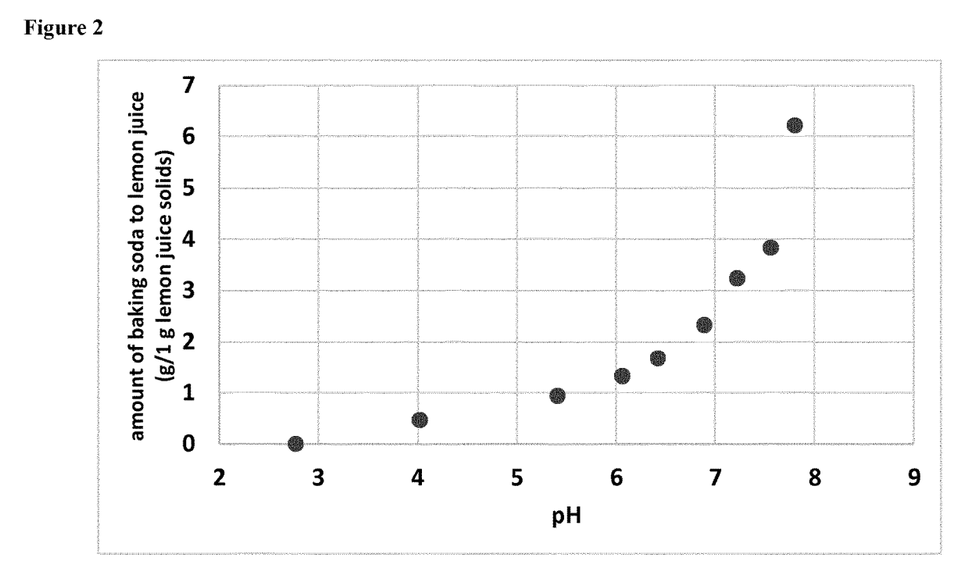
FIG. 2 shows the impact of baking soda/lemon juice ratio on the creamer acidity.

The creamers in embodiments of the present disclosure demonstrate an in-situ chemical reaction where acids (e.g. citric, malic) from natural juice (e.g. lemon) react with natural alkaline (e.g. baking soda). The resulting citric and/or malic salts are used in-situ to chelate the minerals from water hardness, such as calcium and magnesium to prevent the curdling in coffee beverage. The capacity of mineral chelation is based on the total amount of citric and/or malic salts in creamer (FIG. 1&2).

Figure 3:
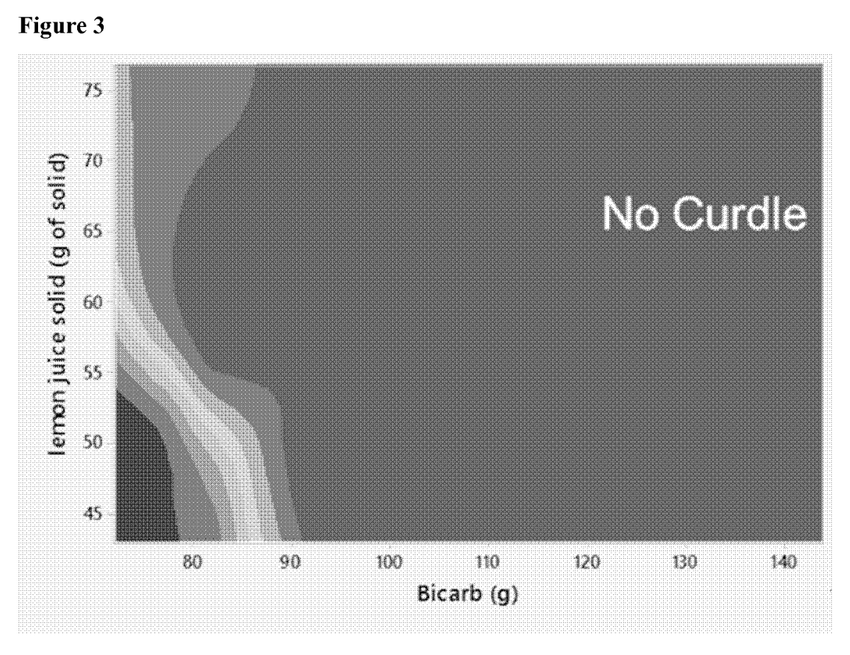
FIG. 3 shows the relationships between the amount of baking soda, lemon juice (dry basis) and curdling in coffee beverages.

With the total hardness of 400 ppm in beverage, e.g. coffee, the ratio of baking soda:lemon juice (total solid basis) is preferred between 1 to 3, more preferred 1.3 to 2.5, even more preferred 1.5 to 1.8. The total lemon juice (solid basis) added is preferred 0.5 to 0.8%, more preferred 0.57 to 0.75%, and most preferred 0.65 to 0.7%. The total baking soda added is preferred 0.8 to 1%, more preferred, 0.83 to 0.92% and most preferred 0.85 to 0.88%. The lemon juice or other fruit juices are functioned as a mineral chelator to avoid emulsion aggregation or curdling by interaction with minerals (e.g. calcium, magnesium) (FIG. 3).

The creamers in embodiments of the present disclosure demonstrate a pH ranged from 5.2 to 10. A preferred pH of 5.2 to 10, more preferred 6 to 9, and even more preferred 7 to 7.5 is needed to neutralize the acids from coffee (e.g. a medium roasted 100% Columbian Arabic coffee) or other beverages. It is known that acidity causes emulsion to coalescence or aggregate or curdling. pH of creamer also impacts on the creamer physical stability and shelf-life. For the creamer with the most preferred pH ranged from 7 to 7.5, it was most stable; while creamer shows a physical instability during its shelf life when pH is below than 6 as indicated by lumisizer data.

Figure 4:
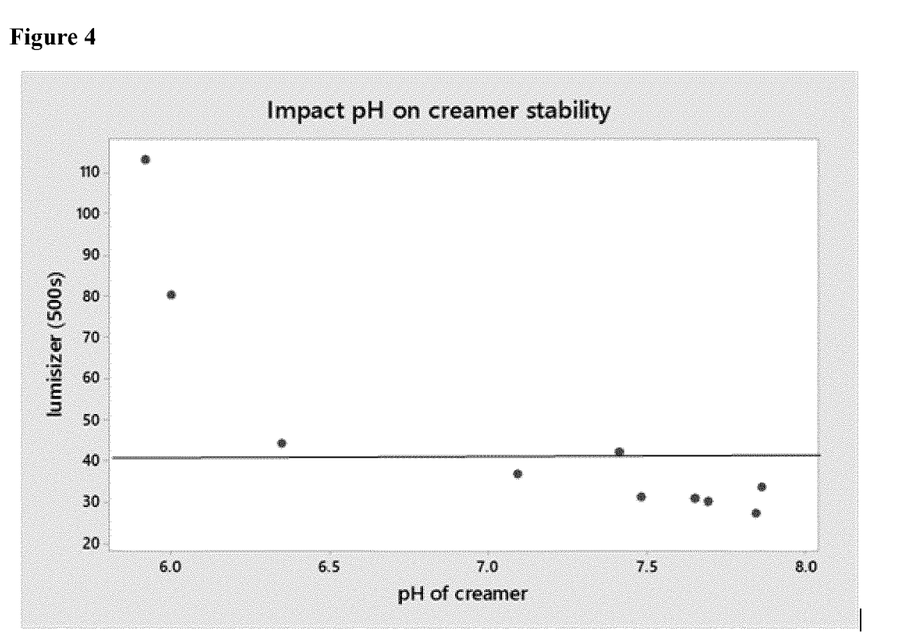
FIG. 4 shows the creamer physical stability as a function of pH.

As used herein, the term "stable" means remaining in a state or condition having no phase separation (e.g., creaming, sedimentation, and/or age gelation) or spoilage or bitterness (e.g., due to storage) for an extended period of time up to 9 months at refrigerated conditions (e.g., about 0.5~7.2° C.). Moreover, Lumisizer instability index is less than 40 (FIG. 4).

The Lumisizer (LUM, Germany) Model 611 was used to evaluate the stability against creaming. Lumisizer (LUM, Germany), is an instrument using light scattering detection under sample centrifugation. It is especially designed to assess different separation phenomena based on oil droplet creaming or particle sedimentation occurring in oil-in-water emulsions and dispersions. In the Lumisizer, the so-called STEP technology (Step and Time resolved Extinction Profiles) is used. The samples were measured without dilution and centrifugal forces were exerted up to 2 hours at 20° C. and 2300 g force. The transmission profiles of samples were taken every 20 sec.

From the raw transmission profiles, the integral of transmission over time is calculated and its slope (named an Instability Index) was used as a quantitative measure for emulsion instability against creaming. Separation graphs shows movements of the interface between the dispersed phase, i.e. the movement of emulsion layers, and the clear phase, as a function of time.

The difference in separation rates (Instability Index) between the samples allowed to assess relative stability of emulsions against creaming. The integral transmission (T) was plotted as a function of time (t), and the slope ($\Delta T/\Delta t$) was calculated. A higher slope (Instability Index) indicates a faster separation and thus a less stable product.

In a general embodiment, the present disclosure provides a creamer free of artificial or chemical additives. The creamers in embodiments of the present disclosure that are all natural ingredients and differ from conventional creamers that contain additives such as anti-foaming agents, surfactants, added emulsifiers (e.g., lecithin, monoglycerides, succinic acid esters of monoglycerides, diacetyl tartaric acid esters of monoglycerides, etc.), buffers(e.g., monophosphates, diphosphates, etc.) and whitening agents (e.g., titanium dioxide, etc.) that are usually used to achieve the desired shelf-life stability and performance (e.g., whitening properties) of dairy, non-dairy based or plant based creamers. Although the creamers in embodiments of the present disclosure do not contain any artificial additives (e.g. stabilizers), the creamers are able to exhibit similar or superior texture, sensorial properties and stability or whitening power than respective conventional creamers containing artificial additives.

In any embodiments of the creamer of the present disclosure, the sugar (e.g., sucrose, monosaccharides, disaccharides, trisaccharides, polysaccharides, etc.) can be from any suitable natural sugar source. Non-limiting examples of the sugar source include beets, canes, honey, molasses, agave syrup, maple syrup, malt, corn, tapioca, potato, sugar cane juice, yacon syrup or a combination thereof. Non-limiting examples of the natural sweeteners source include Lou Han Gou (monk fruit) extract, stevia, rebaudiosides, etc. In any embodiments of the creamer of the present disclosure comprising added sugar, the amount of added sugar in the creamer can range between about 12% and about 30% by mass. More specifically, the sugar can be about 12%, 13%, 14%, 15%, 16%, 17%, 18%, 19%, 20%, 21%, 22%, 23%, 24%, 25%, 26%, 27%, 28%, 29%, 30%, by mass and the like. It should be appreciated that any two amounts of the sugar recited herein can further represent end points in a preferred range of the sugar. For example, the amounts of 20% and 25% by mass can represent the individual amounts of the sugar in the creamer as well as a preferred range of the sugar in the creamer ranging between about 20% and about 25% by mass. As used herein, the term 'mass' can also be considered equivalent to 'weight' where appropriate.

In any embodiments of the creamer of the present disclosure, the fat (e.g., oil) can be from a fat source including at least one of heavy cream, coconut milk, coconut cream, coconut butter, almond butter, almond oil, pumpkin seed oil, Palm oil, all nut butter, all nut pastes, etc. In any embodiments of the creamer of the present disclosure, the amount of fat in the product can range between about 1% and about 9% by mass. More specifically, the fat can be about 1%, 4%, 5%, 6%, 7%, 8%, 9%, by mass and the like. It should be appreciated that any two amounts of the fat recited herein can further represent end points in a preferred range of the fat. For example, the amounts of 3.3% and 5% by mass can represent the individual amounts of the fat in the creamer as well as a preferred range of the fat in the creamer ranging between about 3% and about 10% by mass, for example between 3.3% and 9%. The protein to fat ratio is preferred to be more than 1:25, more preferred to be more than 1:20.

In any embodiments of the creamer of the present disclosure, the sugar:proteins mass ratio of the creamer can range between about 75:1 to about 25:1, for example the ratio may range from 75:1 to 25:1. It should be appreciated that any two amounts of the sugar:protein mass ratio recited herein can further represent end points in a preferred range of the sugar:protein mass ratio. For example, the amounts of 13.5:1 and 16:1 can represent the individual sugar:protein mass ratios in the creamer as well as a preferred range of the sugar:protein mass ratio in the creamer ranging between about 13.5:1 and about 16:1.

The creamers in embodiments of the present disclosure can further include any other suitable ingredients such as natural flavors, natural sweeteners and/or natural colorants. Flavors can be, for example, chocolate, cocoa, hazelnut, caramel, vanilla, etc. Sweeteners can be, for example, stevia extract, Luo Han Guo extract, etc. Usage level of the flavors, sweeteners and colorants will vary greatly and will depend on such factors as the level and type of flavors, sweeteners and colors used and cost considerations.

The creamer alternative embodiments of the present disclosure can be stored at refrigerated temperatures not causing unfavorable phenomena such as aggregation, separation, gelling, clogging or clumping in itself or in the finished beverages when the creamer is added to coffee/tea.

The creamers in alternative embodiments of the present disclosure can be easily dispersible in coffee and stable in hot and cold acidic environments without one or more of the following problems: feathering, breaking emulsion, de-oiling, flocculation and sedimentation. When added to coffee, tea, cocoa or other liquid products, the creamers can provide a high whitening capacity, a good mouthfeel, full body, smooth texture, and also a good flavor with no off-flavor notes that could be developed during storage time. The creamers can be used with other various food products such as cereals, as cream for berries, creamers for soups or in many cooking applications.

As an example of the method according to an embodiment of the present disclosure, a creamer can be prepared by mixing proteins, natural oil and sugar. This creamer mixture can be exposed to a temperature ranges from about 0.5° C. to about 85° C. for a suitable time (e.g., about 20, 25, 30, 35, 40, 45, 50, 55, 60 or more minutes). The creamer mixture can then be sterilized by steam injection or infusion, for example, at minimum of about 141° C. for about 3 seconds or any other suitable heat treatment.

In any embodiments of the methods described herein, during processing and production of the creamer, the mixing of any components of the creamers such as proteins, fat/coconut cream and coconut oil, lemon juice, baking soda, sugar(s), flavor(s), etc., in liquid can be done under agitation, with or followed by heat treatment, homogenization, cooling and filling aseptic containers under aseptic conditions. Aseptic heat treatment may use direct or indirect ultra-high temperature ("UHT") steam injection or steam infusion processes. UHT processes are known in the art. Examples of UHT processes include UHT sterilization and UHT pasteurization.

Direct heat treatment can be performed by injecting steam in the mix. In this case, it may be necessary to remove excess water, by flashing. Indirect heat treatment can be performed with a heat transfer interface in contact with the mix. The homogenization could be performed before and/or after the heat treatment. It may be interesting to perform homogenization before heat treatment in order to improve heat transfers in the mix, and thus achieve an improved heat treatment. Performing a homogenization after heat treatment usually ensures that the oil droplets in the emulsion have the desired dimension. Aseptic filling is described in various publications, such as articles by L. Grimm in "Beverage Aseptic Cold Filling" (Fruit Processing, July 1998, p. 262-265), by R. Nicolas in "Aseptic Filling of UHT Dairy Products in HDPE Bottles" (Food Tech. Europe, March/April 1995, p. 52-58) or in U.S. Pat. No. 6,536,188 B1 to Taggart, which are incorporated herein by reference.

The creamer of the invention may comprise lemon juice concentrate having a ratio of citric acid and malic acid ranged from 30:1 to 15:1.

EXAMPLES

Example 1

By way of example and not limitation, the following examples are illustrative of various embodiments of the present disclosure.

Figure 5:
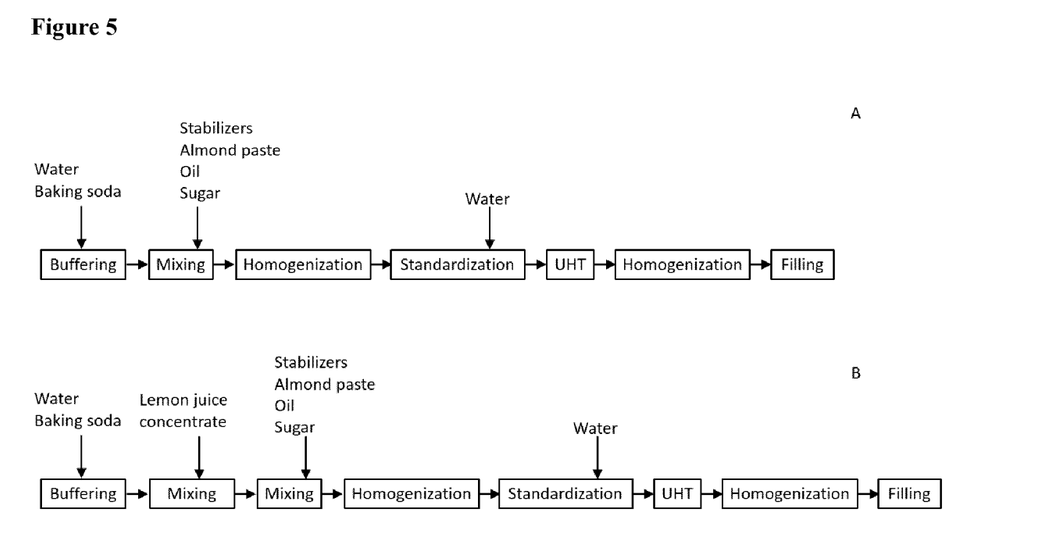
FIG. 5: Process diagram of liquid creamers with (A) and without (B) addition of lemon juice solids.

Liquid creamers were produced as below. The process is demonstrated by process diagram (FIG. 5a).

A dry blend of sugar, sodium bicarbonate, high acyl gellan gum, guar gum, yellow pea protein, sea salt, natural flavors was prepared by mixing together 27,000 g of sucrose with 300 g of sodium bicarbonate, 100 g of high acyl gellan, 100 g of guar gum, 500 g of pea protein, 100 g of sea salt, 111 g of natural flavors. The dry blend was added into 50 kg of hot water (~75° C.) under high agitation.

Next, and after 5 minutes of mixing under continuous high agitation, 4.5 kg of almond paste were added into the tank under high agitation for 5 minutes.

Next, and after 5 minutes of mixing under continuous high agitation, 3.0 kg of coconut oil were added into the tank under high agitation for 5 minutes. Additional water was added to adjust the total amount to 100 kg.

The liquid creamer was pre-homogenized at 130/28, pre-heated, UHT treated for 12 sec at 139° C., homogenized at 130/28 bar and cooled. The liquid creamer was aseptically filled into bottles. The resultant liquid creamer can be aseptically filled in any aseptic containers such as, for example, jars, jugs or pouches. The liquid creamer was stored 5 month at 4° C.

The physico-chemical stability and sensory of creamer and coffee beverages with added liquid creamer were judged by trained panelists. No phase separation (creaming, de-oiling, marbling, etc), gelation, and practically no viscosity changes were found during the storage.

It was surprisingly found that the liquid creamer has good appearance, mouth-feel, smooth texture and a good flavor without "off" taste. In addition, the creamer showed high whitening capacity when added to a coffee.

Figure 6:
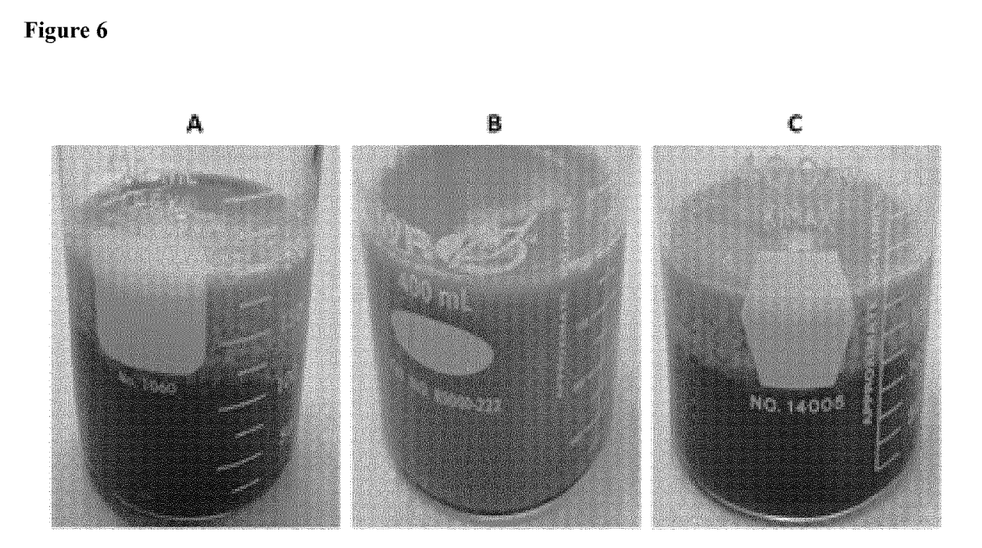
FIG. 6: Visual appearance of liquid almond-based coffee creamers in 100% Colombian coffee brewed with water hardness at 240 ppm where Example 1 is presented in A and Example 2 is presented in B.

It was surprisingly found that the liquid creamer curdled or flocculated when added in 100% Arabica coffee (e.g. 100% medium roast Colombian) brewed with water with hardness higher 240 ppm as shown in FIG. 6A.

Example 2

A liquid creamer was prepared as in Example 1 but using 800 g of baking soda and 1.2 kg of lemon juice concentrate 400 GPL. Prior to the dispersion of the dry blend as cited in Example 1, the baking soda was added into 50 kg of hot water (~75° C.) under high agitation for 5 minutes and then the lemon juice concentrate 400 GPL was added and mixed for 5 minutes. The process is demonstrated by process diagram (FIG. 5b). The physico-chemical stability and sensory of creamer and coffee beverages with added liquid creamer were judged by trained panelists. No phase separation (creaming, de-oiling, marbling, etc), gelation, and practically no viscosity changes were found during the storage. It was surprisingly found that the liquid creamer did not curdle or flocculate when added in 100% Arabica coffee (e.g. 100% medium roast Colombian) brewed with water with hardness higher 240 ppm as shown in FIG. 6B.

Example 3

A dry blend of sugar, sodium bicarbonate, high acyl gellan gum, and yellow pea protein, was prepared by mixing together 27,000 g of sucrose with 250 g of sodium bicarbonate, 90 g of high acyl gellan, and 500 g of pea protein. The dry blend was added into 50 kg of hot water (~75° C.) under high agitation.

Next, and after 5 minutes of mixing under continuous high agitation, 17 kg of coconut (in form of cream) were added into the tank under high agitation. After 5 minutes, 3.0 kg of coconut oil were added and mixed for 5 minutes. Additional water was added to adjust the total amount to 100 kg.

The liquid creamer was pre-homogenized at 130/30, pre-heated, UHT treated for 12 sec at 136° C., homogenized at 130/30 bar and cooled. The liquid creamer was aseptically filled into bottles. The resultant liquid creamer can be aseptically filled in any aseptic containers such as, for example, jars, jugs, or pouches. The liquid creamer was stored 5 months at 4° C.

The physic-chemical stability and sensory of creamer and coffee beverages with added liquid creamer were judged by trained panellists. No phase separation (creaming, de-oiling, marbling, etc.), gelation, and practically no viscosity changes were found during the storage.

It was surprisingly found that the liquid creamer has good appearance, mouth-feel, smooth texture and a good flavour without "off" taste. In addition, the creamer showed high whitening capacity when added to a coffee.

Figure 7:
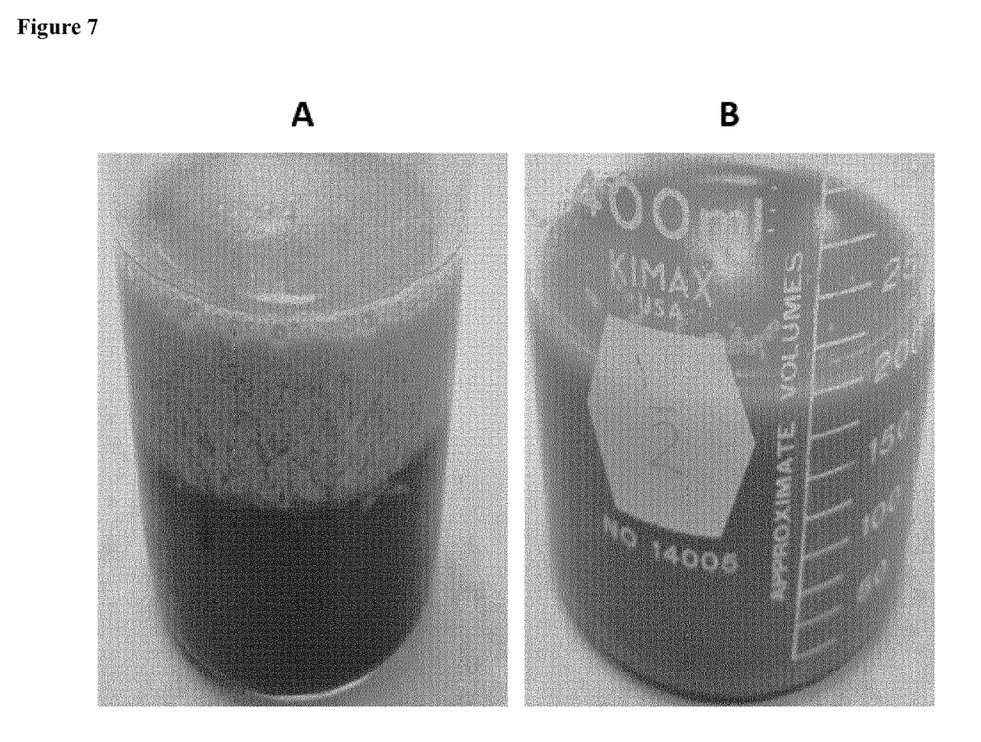
FIG. 7: Visual appearance of liquid coconut-based coffee creamers in 100% Colombian coffee brewed with water hardness at 200 ppm.

It was surprisingly found that the liquid creamer curdled or flocculated when added in 100% Arabica coffee (e.g. 100% medium roast Colombian) brewed with water with hardness higher 240 ppm as shown in FIG. 7A.

Example 4

A liquid creamer was prepared as in Example 3 but using 850 g of baking soda, 1.4 kg of lemon juice concentrate 400 GPL. Prior to the dispersion of the dry blend as cited in Example 3, the baking soda was added into 50 kg of hot water (~75° C.) under high agitation for 5 minutes and then the lemon juice concentrate 400 GPL was added and mixed for 5 minutes. The process is demonstrated by process diagram (FIG. 6b). The physico-chemical stability and sensory of creamer and coffee beverages with added liquid creamer were judged by trained panelists. No phase separation (creaming, de-oiling, marbling, etc), gelation, and practically no viscosity changes were found during the storage. It was surprisingly found that the liquid creamer did not curdle or flocculate when added in 100% Arabica coffee (e.g. 100% medium roast Colombian) brewed with water with hardness higher 240 ppm as shown in FIG. 7B.

Example 5

A liquid was prepared as in Example 1 but using 300 g of baking soda and 400 g of chemically produced sodium citrate. The physico-chemical stability and sensory of creamer and coffee beverages with added liquid creamer were judged by trained panelists. No phase separation (creaming, de-oiling, marbling, etc), gelation, and practically no viscosity changes were found during the storage. It was surprisingly found that the liquid creamer curdled or flocculated when added in 100% Arabica coffee (e.g. 100% medium roast Colombian) brewed with water with hardness higher 240 ppm as shown in FIG. 6C.

Aspects of the subject matter described herein are set out in the following numbered clauses:

1. A creamer comprising free of artificial additives comprising added sugar, plant oil, proteins, further characterized in that the creamer comprises baking soda and citrus fruit juice concentrate, wherein the citrus fruit juice concentrate comprises acid component comprising citric acid and Malic acid.

2. The creamer of clause 1, wherein ratio of baking soda to acid component is between 1 to 3 more preferred 1.3 to 2.5, even more preferred 1.5 to 1.8.

3. The creamer of clause 1, wherein citrus fruit juice concentrate comprises lemon juice, grape fruit, orange, berries, lime and combinations thereof.

4. The creamer of clause 1, wherein the ratio of proteins: fat is more than 1:12; and wherein the Lumisizer instability index is less than 40.

5. The creamer of clause 1 wherein creamer pH is greater than 6.

6. The creamer of Clause 1, wherein the proteins are plant proteins comprising liquid pea extract, pea juice, pea protein isolates, pea powder, potato protein isolates, pumpkin seed protein isolates, almond proteins, lentils protein isolates, rice proteins isolates, peanuts protein isolates, quinoa protein isolates, and combinations thereof.

7. The creamer of Clause 1, wherein the creamer comprises an added sugar:protein mass ratio ranging from about 75:1 to about 25:1.

8. The creamer of Clause 1, wherein the added sugar is from a sugar source comprising beets, canes, condensed milk, honey, molasses, agave syrup, maple syrup, malt, corn, tapioca, potato and combinations thereof.

9. The creamer of Clause 1, wherein the plant oil is a fat source comprising coconut oil, coconut cream, almond oil, almond butter, almond paste, cashew oil, cashew butter, cashew paste and combinations thereof.

10. The creamer of Clause 1 further comprises flavors, natural sweeteners, and combinations thereof.

11. The creamer of Clause 10, wherein the natural sweeteners source comprises Lou Han Gou (monk fruit) extract, stevia, rebaudiosides, and combinations thereof.

12. The creamer of clause 1, wherein the plant oil ranges between 3.3% and 9% by mass.

13. A process for manufacturing creamer of clause 1, comprising the steps of:
 (i) Obtaining ingredients including oils kept under low agitation or alternative process conditions to avoid foam generation;
 (ii) Preparing a premix solution comprising baking soda and water.
 (iii) Addition of citrus juice concentrate to baking soda solution at a high agitation to release CO2 and result in a natural chelating solution.
 (iv) Low shear mixing of the premix in presence of plant protein powder, plant oil, sugar to achieve a completed hydration of dry ingredients and optionally add flavor;
 (v) Homogenization at conditions configured to obtain an emulsion particle size ranging from 0.01 to 2 μm (micrometers) with a d50<1 μm and d90<2 μm, peaked at 0.7 μm, and few particles above 10 μm;

(vi) UHT treatment; and (vii) Filing the container aseptically at 0.5-20° C.

14. A process of clause 13, wherein the UHT treatment temperature is at a minimum 141° C. for about 3 seconds or any other suitable combinations.

15. The method of Clause 13 comprising homogenizing and aseptically processing the creamer.

16. The method of Clause 13, wherein the suitable temperature ranges from about 0.5 to about 85° C.

The invention claimed is:

1. A process for manufacturing a creamer free of artificial additives that are anti-foaming agents, surfactants, added emulsifiers, buffers, and whitening agents, the process comprising:

(i) preparing a premix solution comprising baking soda and water;

(ii) adding a lemon juice concentrate to the premix solution with agitation to form a natural chelating solution, wherein the lemon juice concentrate comprises an acid component comprising citric acid and malic acid;

(iii) low shear mixing of the natural chelating solution in the presence of a plant protein, a fat comprising a plant oil and a sugar to achieve a complete hydration of dry ingredients to form a composition; and (iv) homogenizing the composition, wherein the total baking soda added is 0.8 to 1.0 wt % of the creamer at a ratio of the baking soda:the lemon juice concentrate on a total solid basis from 1.3:1 to 2.5:1, the creamer comprises a gum selected from the group consisting of gellan gum, guar gum and combinations thereof, the plant oil ranges between 3% and 10% by mass of the creamer, a mass ratio of the sugar:the plant protein ranges from 75:1 to 25:1, and a mass ratio of the plant protein:the fat is more than 1:20, and the only plant protein in the creamer is selected from the group consisting of pea protein, potato protein, lentil protein, rice protein, quinoa protein, oat protein, and combinations thereof.

2. The process of claim 1, wherein the creamer has a pH greater than 6.

3. The process of claim 1, wherein the plant oil is a fat source selected from the group consisting of coconut oil, coconut cream, almond oil, almond butter, almond paste, cashew oil, cashew butter, cashew paste, and combinations thereof.

4. The process of claim 1, wherein the creamer comprises a flavor.

5. The process of claim 1, wherein the creamer comprises a natural sweetener selected from the group consisting of Luo Han Gou (monk fruit) extract, stevia, rebaudiosides, and combinations thereof.

6. The process of claim 1, wherein the homogenization is performed after a heat treatment, the heat treatment being direct or indirect ultra-high temperature steam injection or steam infusion processes.

7. The process of claim 6, wherein the creamer is filled into an aseptic container under an aseptic condition.

8. The process of claim 1, wherein the only plant protein in the creamer is pea protein.

* * * * *